United States Patent
Hood et al.

(10) Patent No.: US 7,912,560 B2
(45) Date of Patent: *Mar. 22, 2011

(54) MODULE AND CONTROLLER OPERATION FOR INDUSTRIAL CONTROL SYSTEMS

(75) Inventors: Gavan W. Hood, Upper Lockyer (AU); Kenwood H. Hall, Hudson, OH (US); Sujeet Chand, Brookfield, WI (US); Paul R. D'Mura, Glendale, AZ (US); Michael D. Kalan, Highland Heights, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/536,760

(22) Filed: Sep. 29, 2006

(65) Prior Publication Data
US 2008/0082186 A1    Apr. 3, 2008

(51) Int. Cl.
*G06F 19/00* (2006.01)
(52) U.S. Cl. ............................ 700/20; 710/100; 709/224
(58) Field of Classification Search ................ 700/1–2, 700/17–20, 83, 86, 89; 717/10, 11, 5, 9; 709/1, 100, 303, 202, 224; 715/771, 780, 715/764; 710/100, 105
See application file for complete search history.

(56) References Cited

U.S. PATENT DOCUMENTS

| | | | |
|---|---|---|---|
| 5,485,620 A * | 1/1996 | Sadre et al. ............... | 717/162 |
| 5,522,066 A | 5/1996 | Lu | |
| 5,530,861 A | 6/1996 | Diamant et al. | |
| 5,812,394 A | 9/1998 | Lewis et al. | |
| 6,067,299 A | 5/2000 | DuRee | |
| 6,085,222 A * | 7/2000 | Fujino et al. ............... | 709/202 |
| 6,269,254 B1 | 7/2001 | Mathis | |
| 6,868,538 B1 | 3/2005 | Nixon et al. | |
| 7,043,311 B2 | 5/2006 | Nixon et al. | |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 2002/0059272 A1 | 5/2002 | Porter | |
| 2002/0156548 A1 | 10/2002 | Arackaparambil et al. | |
| 2003/0150927 A1 | 8/2003 | Rosen | |

(Continued)

FOREIGN PATENT DOCUMENTS

DE    101 29 564 A1    9/2002

(Continued)

OTHER PUBLICATIONS

Swett et al., Managing Technology Cahnge in Industrial Automation An ABB Overview of Research Priorites, 1994, IEEE, Pagem 3-6.*

(Continued)

*Primary Examiner* — Kidest Bahta
(74) *Attorney, Agent, or Firm* — Turocy & Watson LLP; William R. Walbrun; John M. Miller

(57) ABSTRACT

A controller and module for an industrial automation system is provided. A logical module employs resources and logic to expose functionality of the module while providing generic interfaces to external components of the module. A controller is operable with the logical module to provide interactions with components that are at, above, or below a layer associated with the controller.

22 Claims, 16 Drawing Sheets

U.S. PATENT DOCUMENTS

| | | | |
|---|---|---|---|
| 2003/0163656 A1 | 8/2003 | Ganton | |
| 2004/0199925 A1 | 10/2004 | Nixon et al. | |
| 2004/0230328 A1* | 11/2004 | Armstrong et al. | 700/83 |
| 2005/0256735 A1 | 11/2005 | Bayne | |
| 2006/0037008 A1* | 2/2006 | Stelzer et al. | 717/136 |
| 2006/0179032 A1 | 8/2006 | Gottsman et al. | |
| 2006/0206448 A1 | 9/2006 | Hyder et al. | |
| 2006/0212146 A1* | 9/2006 | Johnson et al. | 700/89 |
| 2007/0089063 A1* | 4/2007 | Breyer | 715/763 |
| 2007/0142941 A1* | 6/2007 | McGreevy et al. | 700/83 |
| 2007/0256051 A1 | 11/2007 | Rojer | |
| 2008/0022151 A1* | 1/2008 | Stange et al. | 714/10 |
| 2008/0040477 A1* | 2/2008 | Johnson et al. | 709/224 |
| 2008/0140230 A1* | 6/2008 | Bromley | 700/83 |
| 2008/0201297 A1 | 8/2008 | Choi et al. | |

FOREIGN PATENT DOCUMENTS

| | | |
|---|---|---|
| EP | 1 772 785 A | 4/2007 |
| WO | 0195041 A1 | 12/2001 |
| WO | 02/31607 A | 4/2002 |
| WO | 2004086160 A1 | 10/2004 |

OTHER PUBLICATIONS

Maaref et al., Communication Sysyem for Industrial Automation, 1997, Laboratoire Logiciels System Reseaux-Image, IEEE, p. 1286-1291.*

European Search Report for European Patent Application No. EP07117140, dated May 7, 2008, 8 pages.
OA Dated Oct. 6, 2008 for U.S. Appl. No. 11/536,715, 9 pages.
OA Dated Oct. 29, 2008 for U.S. Appl. No. 11/536,746, 24 pages.
OA Dated Oct. 29, 2008 for U.S. Appl. No. 11/536,791, 43 pages.
OA dated Apr. 17, 2009 for U.S. Appl. No. 11/536,791, 37 pages.
European Search report dated Nov. 20, 2009 for European Application No. EP 07 11 7192, 9 pages.
"SIMATIC, Working with STEP V5.1, Edition Aug. 2000, A5E00069681-03". Aug. 2000, Siemens, D-90327, Nurnberg, DE, XP002554626, 24 pages.
Fayad, et al. "HMI as a Maintenance Tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph, 16 pages.
OA Dated Jan. 9, 2009 for U.S. Appl. No. 11/536,827, 18 pages.
OA dated Jan. 26, 2010 for U.S. Appl. No. 11/536,791, 39 pages.
OA dated Mar. 24, 2009 for U.S. Appl. No. 11/536,715, 38 pages.
OA dated Mar. 8, 2010 for U.S. Appl. No. 11/536,746, 21 pages.
OA dated Aug. 24, 2009 for U.S. Appl. No. 11/536,746, 18 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.

* cited by examiner

MODULE AND CONTROLLER OPERATION FOR INDUSTRIAL CONTROL SYSTEMS

TECHNICAL FIELD

The subject invention relates generally to industrial control systems and more particularly to a module structure that exposes functionality of a component between elements of an organization yet provides an abstraction from details for communicating and interacting with such elements. The module structure operates within an industrial controller to interact with higher and lower level components of an enterprise.

BACKGROUND

Industrial controllers historically have operated in factory networks where a plurality of controllers and associated I/O modules communicate. These lower level control elements are often in communication with higher level computing systems or servers that aggregate data from the controllers and help to manage day-to-day activities of an enterprise. As systems have become more complex however, communications and functional cooperation between components has become a challenge. For instance, when users purchase multiple products from one or more vendors there is often limited interoperability and consistency between such products. Software and control engineers must then learn their unique product and how the components interact with each other. Limited product and component consistency suggest that techniques engineers learn in one product do not necessarily carry over to other implementations. In general, control and application systems use different interfaces that make mapping difficult; meanwhile qualified personnel that understand both hardware and software environments are in short supply and command high salaries.

Often times, integration of products (production and automation systems in particular) is too complex and difficult to manage. Process and control engineers cannot code and configure their respective components of a solution without concern for other system components. In addition, system startup metrics are generally not sufficient to supply clear and measurable information for the user/integrator. In one example, a user specifies a line production system with both control and software system components. The development (customization) and integration cost is significant allowing for long ramp-up and integration due to the complexity of connecting systems and uncertainty of how the system will perform. This has a significant impact beyond the cost of the control system as line commissioning and ramp-up are delayed during control system integration. A more predictable process and less complex system integration capability will reduce these costs.

Another problem with current control solutions is that users currently focus on implementation and glue logic rather than the production solution at hand. The underlying technical details have become a primary worry where engineers from multiple environments do not focus on process information (application level concerns) and values exchanged, rather they more often focus on the "how" not the "what." For instance, a user may decide to automate a manual section of their plant. The design may start at a high level but soon becomes a series of discussions regarding nonfunctional requirements e.g., DCOM, TCP, transaction rates, and the like. While these nonfunctional requirements are important, the design of functional requirements is where the true value is to the designer or end user. Thus, the user would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be better distributed across the system in accordance with system capabilities. Thus, if one part of the system is shut down, alternative processing capability should be in place to allow production to continue. For example, a user initially designs and installs a control system suiting their immediate needs. Incremental changes are then applied to controllers and often new interface functions are added to the human machine interface (HMI) for such controllers. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and reduces its ability to easily configure such systems.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A logical module and controller provide the ability to interact with various layers of an enterprise that are at, above, or below the control layers of the enterprise. A logical module is operable with or on the controller and facilitates access to a broad range of control system or enterprise functionality while hiding complex details of interfacing to such functionality. In one aspect, a module provides an association of logic with one or more resources, where the logic controls the state of the resources and the resources define components or states of a system. Various modules can be loaded onto the controller and support interfaces to a plurality of components and communications layers in the enterprise.

In one example, an enterprise module may reside on the controller to exchange data with an upper level tier such as a Manufacturing Execution System (MES) layer of an organization. In another case, modules may be adapted to form an application of modules that exist over various control elements at the control layer of the enterprise. Similarly, controllers can communicate with modules that are adapted to interface with lower levels of an enterprise or factory such as I/O modules, I/O devices, sensors, and so forth. By adapting module functionality to the controller, communications and control can be enhanced throughout an enterprise while mitigating the need for custom or diverse software at the respective levels of the enterprise. This in turn simplifies system integration requirements and reduces costs of the enterprise.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Systems and methods are provided to facilitate interaction with an industrial control system while mitigating interface requirements and integration nuances of diverse components of the system. In one aspect, a controller and module for an industrial automation system is provided. A logical module employs resources and logic to expose functionality of the module while providing generic interfaces to external components of the module. A controller is operable with the logical module to provide interactions with components that are at, above, or below a layer associated with the controller. The controller can be operable with an enterprise module to interact with an MES layer of an enterprise, for example. The controller communicates with at least one other controller and associated logical module to form a control application and/or is operable with a device module that interacts with I/O devices, for example. Also, the controller can communicate with a messaging infrastructure for communicating information between components, where the controller can be employed to communicate with components at, above, or below a layer associated with the messaging infrastructure.

It is noted that as used in this application, terms such as "component," "resource," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
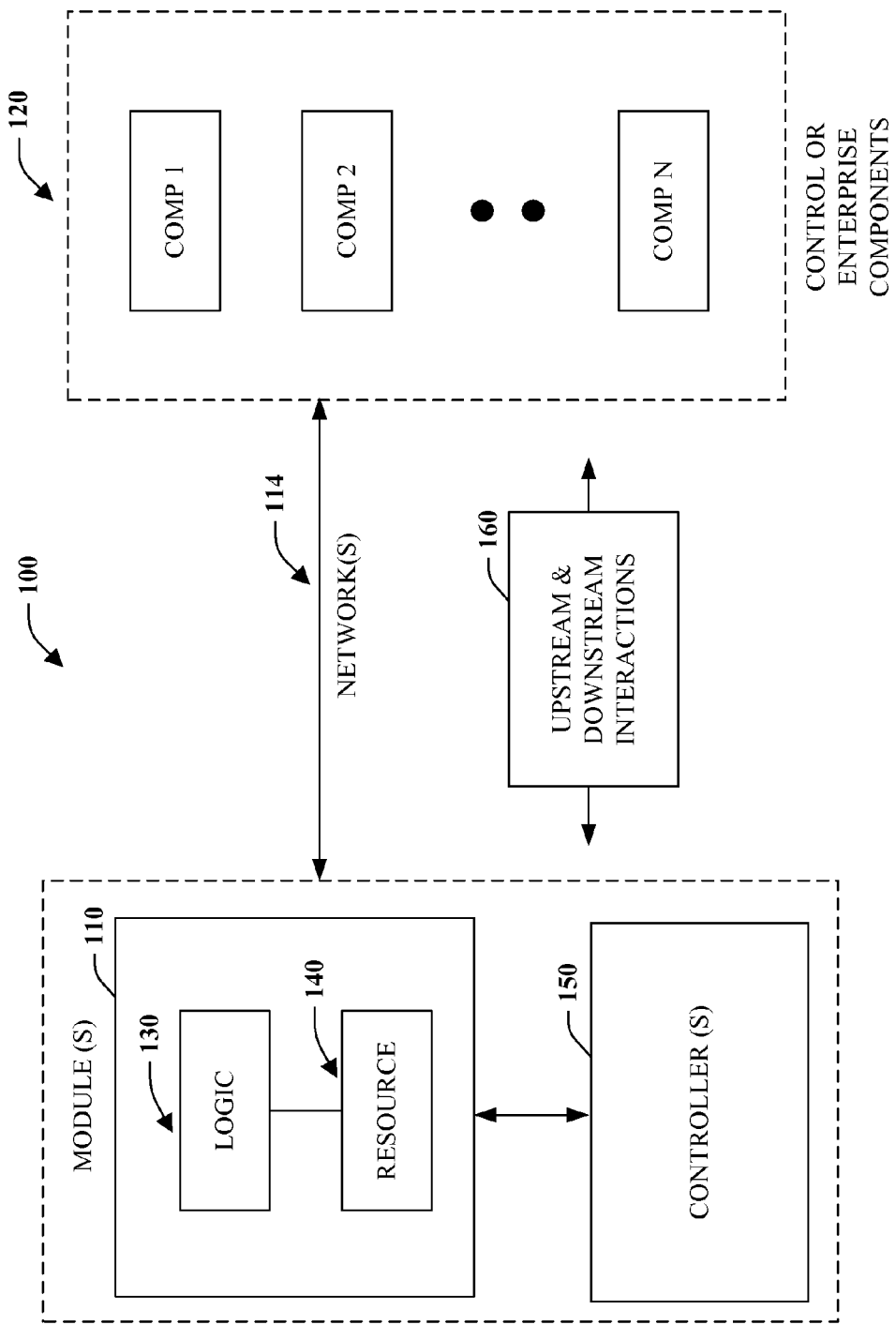
FIG. 1 is a schematic block diagram illustrating logical modules and controllers for an industrial automation system.

Referring initially to FIG. 1, a system 100 illustrates a module component 110 (hereinafter referred to as a module) for an industrial automation system. The module 110 is employed to define, interface, and execute functionality of one or more industrial control system components 120 which are described in more detail below. As illustrated, the modules 110 can be accessed across a network 114 from the control components 120 which include higher and lower levels of an enterprise as will be described in more detail below. As shown, the modules 110 are operable with a controller 124 to facilitate interaction and communication with the components 120 across the network 114. Modules 110 can be interfaced by users via standard interface methods such as via a graphical user interface (GUI) and/or can be configured to interact with a plurality of other modules 110, controllers 124, and/or control components 120.

In general, the module 110 is an association of logic 130 with one or more resources 140. The logic 130 includes program code that can alter the state of a resource 140 for example, ladder code, function chart, script, JAVA, C code, and so forth. The resources 140 are those components or elements that perform an activity in a system including equipment and personnel that perform work in a system. Other examples of types of resources 140 include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules 110 hide the user from internal interfaces, messages, and logic specific to the resources yet provide standard or generic interfaces to external systems or between components 120.

The module 110 and controller 124 provide the ability to interact with various layers of an enterprise that are at, above, or below control layers of the enterprise. The module 110 is operable with or on the controller 124 and facilitates access to a broad range of control system or enterprise functionality (represented by components 120) while hiding complex details of interfacing to such functionality. Various modules 110 can be loaded onto the controller 124 and support interfaces to a plurality of components 120 and communications layers in the enterprise. As illustrated, the module 110 and controller 124 support interactions/communications that are upstream and downstream from the controller at 160. For example, an enterprise module 110 may reside on the controller 124 to exchange data with an upper level tier (represented by components 120) such as a Manufacturing Execution System (MES) layer of an organization.

In another example, modules 110 may be adapted to form an application of modules that exist over various control elements at the control layer of the enterprise (represented by components 120). Similarly, controllers 124 can communicate with modules that are adapted to interface with lower levels of an enterprise or factory such as I/O modules, I/O devices, sensors, and so forth. As can be appreciated, a plurality of layers can be provided that communicate across similar or differing network protocols. By adapting module 110 functionality to the controller 124, communications and control can be enhanced throughout an enterprise while mitigating the need for custom or diverse software at the respective levels of the enterprise.

In one particular example, a resource control module (described below with respect to FIG. 3) can be implemented in a process controller. When implemented in the controller 124, module instances can be put on scan (in service) as I/O to the device is physically in place on the controller chassis, other types of resource control modules do not have this requirement as they may interact via module data and messaging capabilities. Resource control modules can manage resource data within the module 110 (e.g., sub-lot information, Bill of Materials, Paths, and so forth). The management of resource data can be a significant component of resource control module operation, if desired. Resource control module tasks may be managed by a central control module task in the controller 124. The modules 110 interact with external systems via common internal common data model messages (e.g., path update, calibrate, material move, and so forth). This enables reduction in implementation overhead, for example, by enlisting resource control modules with a common resource control module communications task which sends and receives messages on behalf of substantially all resource control modules associated with the controller 124. This also reduces the overhead on the controller 124. It also enables the implementation of common interface capabilities such as diagnostics and security from a single component source, if desired.

Before proceeding, it is noted that the components 120 can include various computer or network components such as servers, clients, programmable logic controllers (PLCs), communications modules, mobile computers, wireless components, control components and so forth which are capable of interacting across the network 114. Similarly, the term PLC as used herein can include functionality that can be shared across multiple components, systems, and or networks 114. For example, one or more PLCs can communicate and cooperate with various network devices across the network 114. This can include substantially any type of control, communications module, computer, I/O device, sensor, Human Machine Interface (HMI)) that communicate via the network 114 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network 114 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
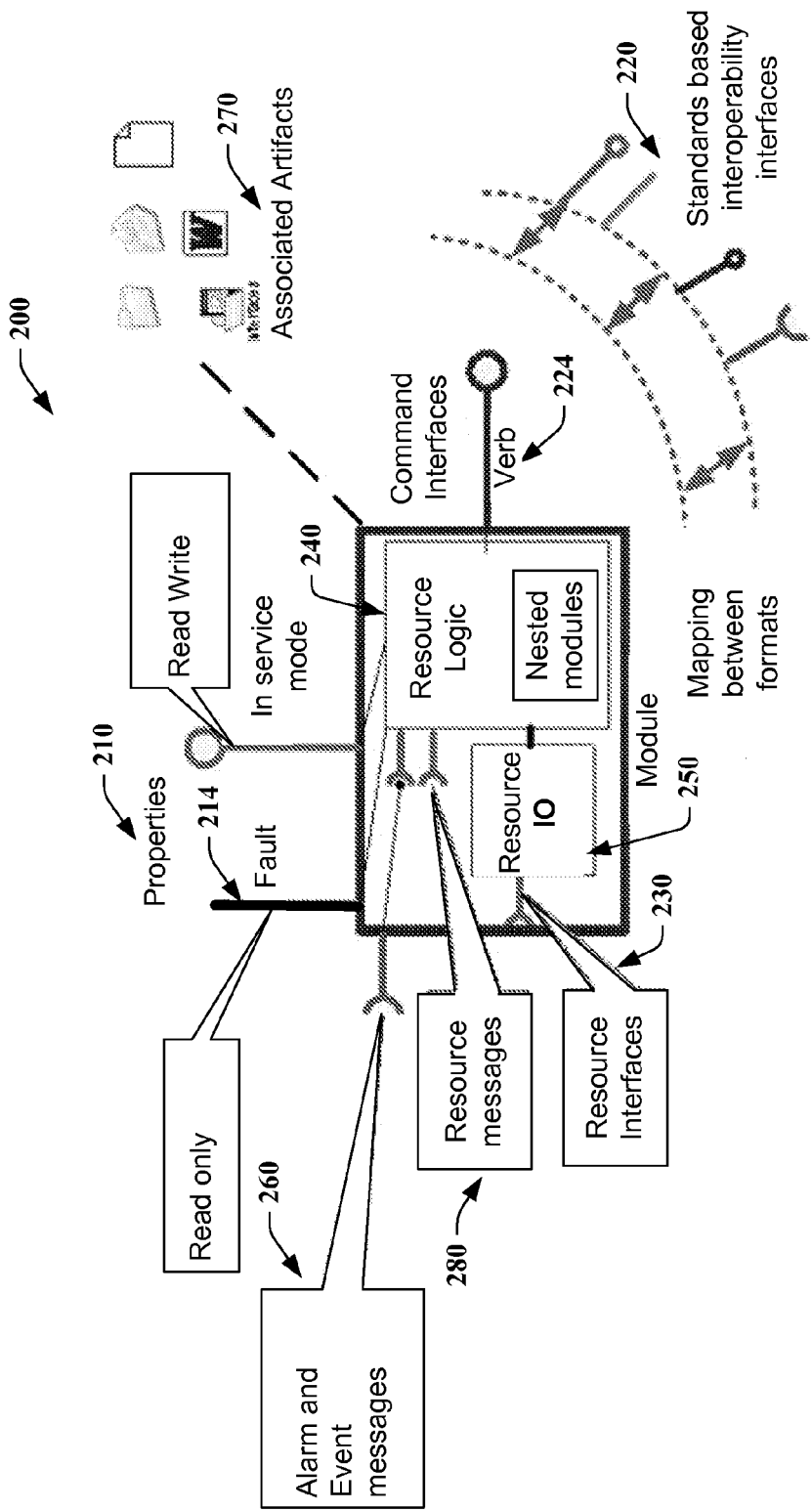
FIG. 2 is a diagram illustrating module attributes.

Referring now to FIG. 2, module attributes 200 are illustrated. The attributes 200 depicted in FIG. 2 include a common (or exemplary) representation that can be modules from modules. Generally, a set of standard attributes can be determined that are common to all modules. Similarly, for other types of modules described below, additional standard attributes can be defined. An example of a property 210 available on modules includes attributes such as Fault and Status at 214. Active resource modules (e.g., equipment and personnel) can support additional properties 210 such as available/unavailable.

Attributes presented below are represented associations from the module to objects which may be internal in a common data model (See. FIGS. 8-11) or elsewhere (e.g., CAD Files). At 220, standard public interfaces can be provided. These interfaces 220 publish verbs 224 that are available to external systems and are documented activities that hide the complexity of the underlying code used to implement the interface. Interfaces 220 can be considered into at least two common usage scenarios. For example, interfaces 220 can be used as access points that can be used to hook in real time diagnostics, security and so forth.

Public verbs 224 initiate an action within the module. The activity is described to clients of the interface 220. The implementation is considered private and is not presented to clients—for example, Open, Stop, Abort, Shut, and so forth. A data value property 210 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 210 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 220. e.g., Conversion Map, Name, Description, expiry date, personnel contact information. Some properties 210 can be common to all instances of resource modules (e.g., scanned copy of resource specification documents), whereas other properties 210 are specific to each module instance (e.g., Status, percent open).

At 230, internal resource interfaces include interfaces from logic 240 in the module to the resource being managed at 250, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 230 are internal to the module enabling the modules public interfaces 220 and properties 210 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 220 to runtime systems may then consider these interfaces as internal.

At 260, alarm and event messages can be provided which include messages that exposed as runtime messages visible to external systems during the execution of the module. This includes alarms and events explicitly coded by the developer and system messages promoted to be visible by external systems. At 270, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 280, system messages allow modules to listen for and publish data model messages to external components. Inbound messages are typically used to manage modules (configure, initialize, propagate properties, and so forth) and publish messages on module activity (resource state, data model messages, and so forth).

Figure 3:
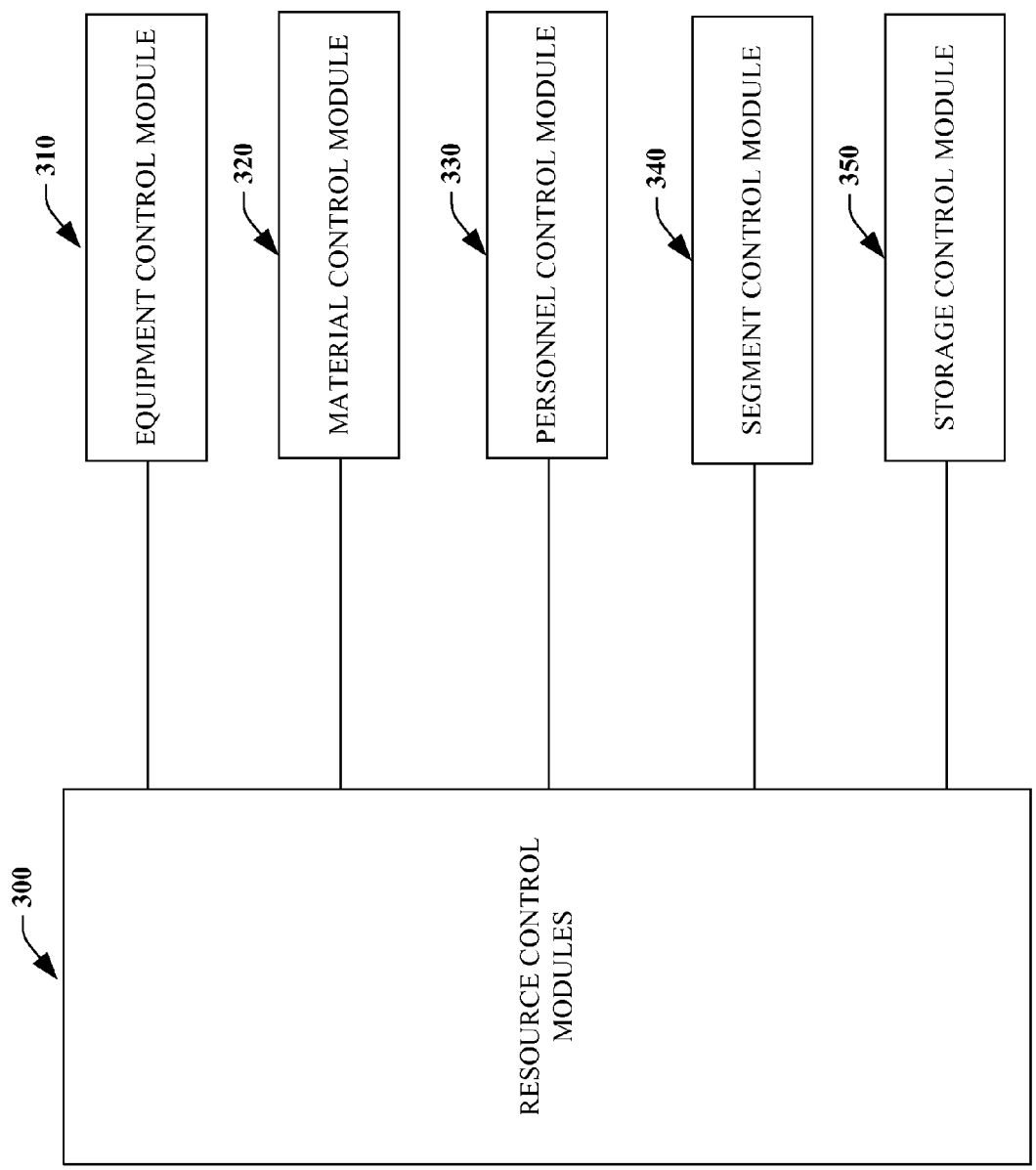
FIG. 3 is a diagram illustrating example resource control modules.

Turning to FIG. 3, example resource control modules 300 are illustrated. In general, resource control modules 300 provide simple control of one or more resources. The resource control module (RCM) 300 represents the logic to manage the state or data of the resource and may contain other resource control modules to achieve its respective functionality. The RCM 300 provides public interfaces via actions and properties. In some cases, an action may be a simple bit value or a request value that is interfaced to internal values in the module and in other cases more complex logic can be provided. The RCM 300 can include other resource control modules and may promote a command to be represented as segment resource control interface. Example forms of the RCM 300 include:

At 310, an Equipment Control Module (Common name="Control Module") CM. The simplest form of basic regulatory control of equipment. Encapsulating the equipment and its control such as control of values, drives, and so forth. At 320, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 330, a Personnel Control Module (PCM) is provided. This includes management of individual people such as Active, Idle, Break states directly or via shift schedules. This also includes data associated with people such as shift time patterns, for example. Other attributes that may be managed by PCM 330 are a person's location in a plant (GPS), qualification checks, or current assignment, for example. At 340, a Segment Control Module (SCM) includes manipulation of simple segment tasks such as piping paths, AGV paths, device state machines, robotic sequences and so forth. The SCM 340 typically performs an action on one segment such as next step to execute after the current step. At 350, a Storage Control Module (STGCM) includes Manipulation of simple storage logic such as buffer capacity and ordering into and out of a queue for the respective storage unit or requirement.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 4:
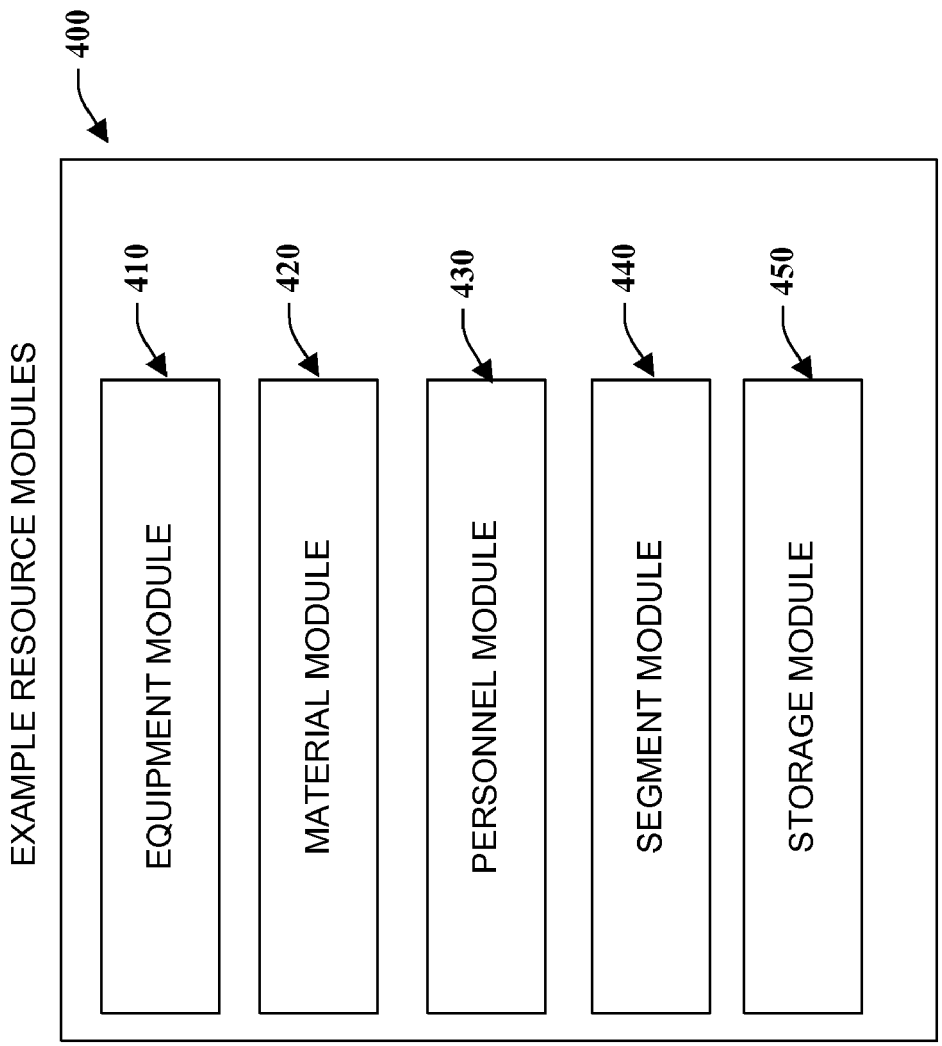
FIG. 4 is a diagram illustrating a resource module.

FIG. 4 illustrates example resource modules 400 for an industrial control system. At 410, an Equipment Module provides coordination of equipment modules and equipment control modules to perform a process orientated task independent of specific material e.g., In-feed, AGV controller, Conveyor, and so forth. At 420, a Material Module provides coordination of material modules and material control modules to perform material focused tasks e.g., Material reservation, provision, material mass balance calculation, Bill of Material management, Work order management, and so forth. At 430, a Personnel Module provides coordination of personnel modules and personnel control modules to perform personnel focused tasks e.g., Electronic signature collection, Security validation, certification validation, Manual control interactions, and so forth.

At 440, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 440 may also construct a sequence to be followed which can be applied as manual, automatic or semi automatic sequences (e.g., Route, recipe execution) At 450, a Storage Module provides coordination of storage related activities, allocation of storage to requesters, modeling of inventory calculations and so forth. This also includes interaction with higher-level systems that manage storage and inventory information.

FIGS. 5-9 illustrate an example design sequence for module and controller interaction. It is to be appreciated that although a reader application is described, a plurality of similar or different applications can be supported.

Figure 5:
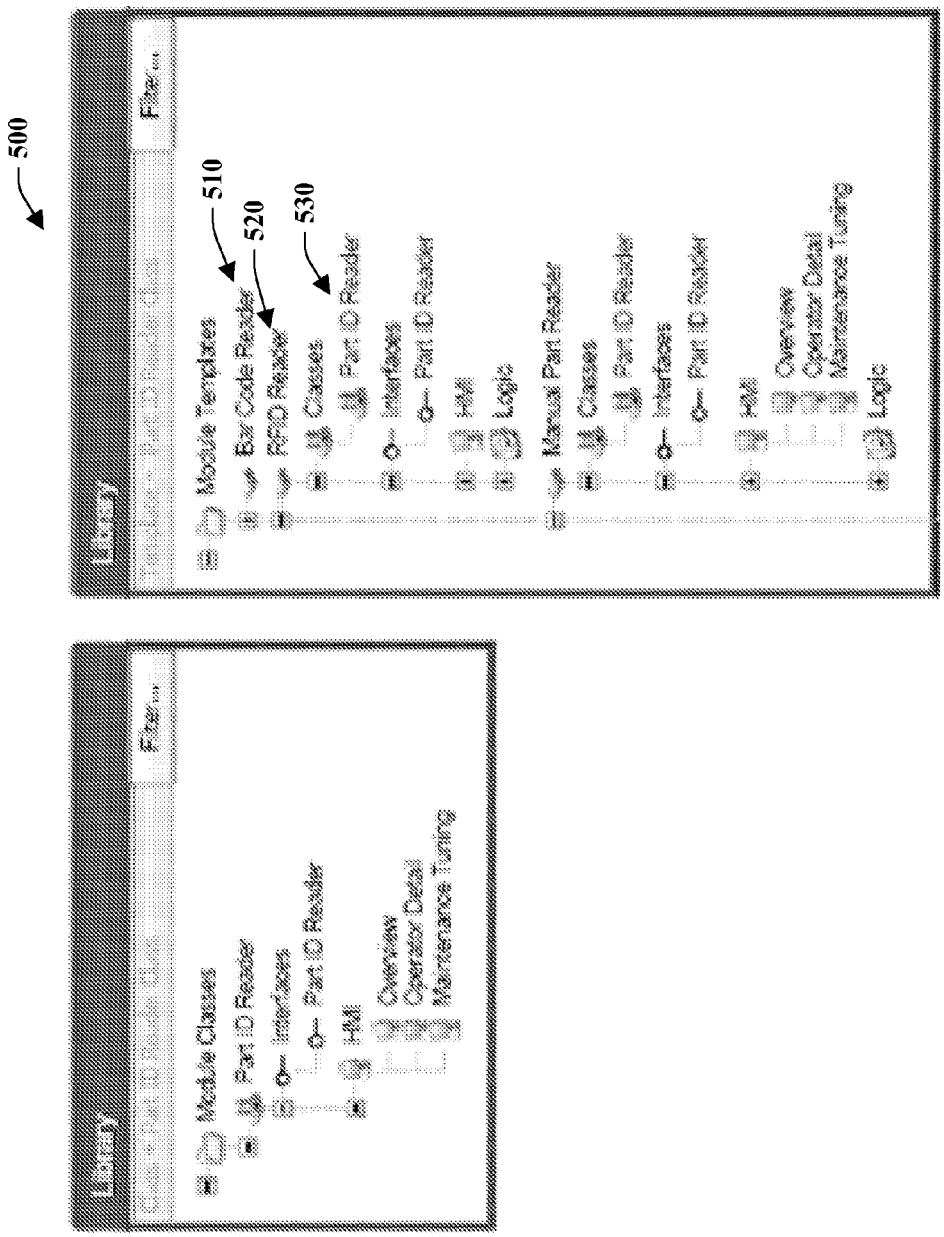
FIGS. 5-9 illustrating example logic configurations modules.

Referring specifically to FIG. 5, an example interface 500 depicts an example reader application. At some point, a designer or engineer creates algorithms and logic to implement the functions described in the module's interface definition. This logic can be developed for a wide array of platforms depending on the requirements of the module. Modules that support an equipment control interface, for example, generally interact with physical I/O points and thus execute in some type of controller whether it be a PLC, SLC, S7, Plantscape, or other 3rd party device, for example. In one case, a native representation of a module can be provided while for other legacy and 3rd party devices, the module logic can be a proxy to the data in those devices. Modules that support the material handling interface might run in an MES application, common data model execution environment, a programmable logic controller, or a combination thereof. Similar choices exist for modules that support procedural control or manual procedure interfaces.

To illustrate these logic aspects, an example design of a Part ID Reader module is provided for use in an automotive plant. In this example, the design engineer plans that there are three different types of Part ID Readers that are used in the plant—a bar code reader shown at 510, an RFID reader 520, and a manually entered Part ID at 530. The engineer's goal may be to define a common class for the Part ID Reader and then develop the logic for each type later.

In this example, the Bar Code Reader 510 runs on a programmable controller, the RFID Reader is a smart device with an onboard processor, and the Manual Reader is supported by an MES application (e.g., Advantage). The logic is then developed in the language(s) that are appropriate to the execution platform. For example:

| Target Platform | Language(s) |
| --- | --- |
| Logix | RLL, FBD, STX, SFC |
| Proxy Logix | Configure mapping of the module interface data to the $3^{rd}$ party or legacy data |
| MES Application | Application specific code (PNUTS, BPEL, etc.) |
| Software Application | Application specific code (Java, .NET, etc.) |

Figure 6:
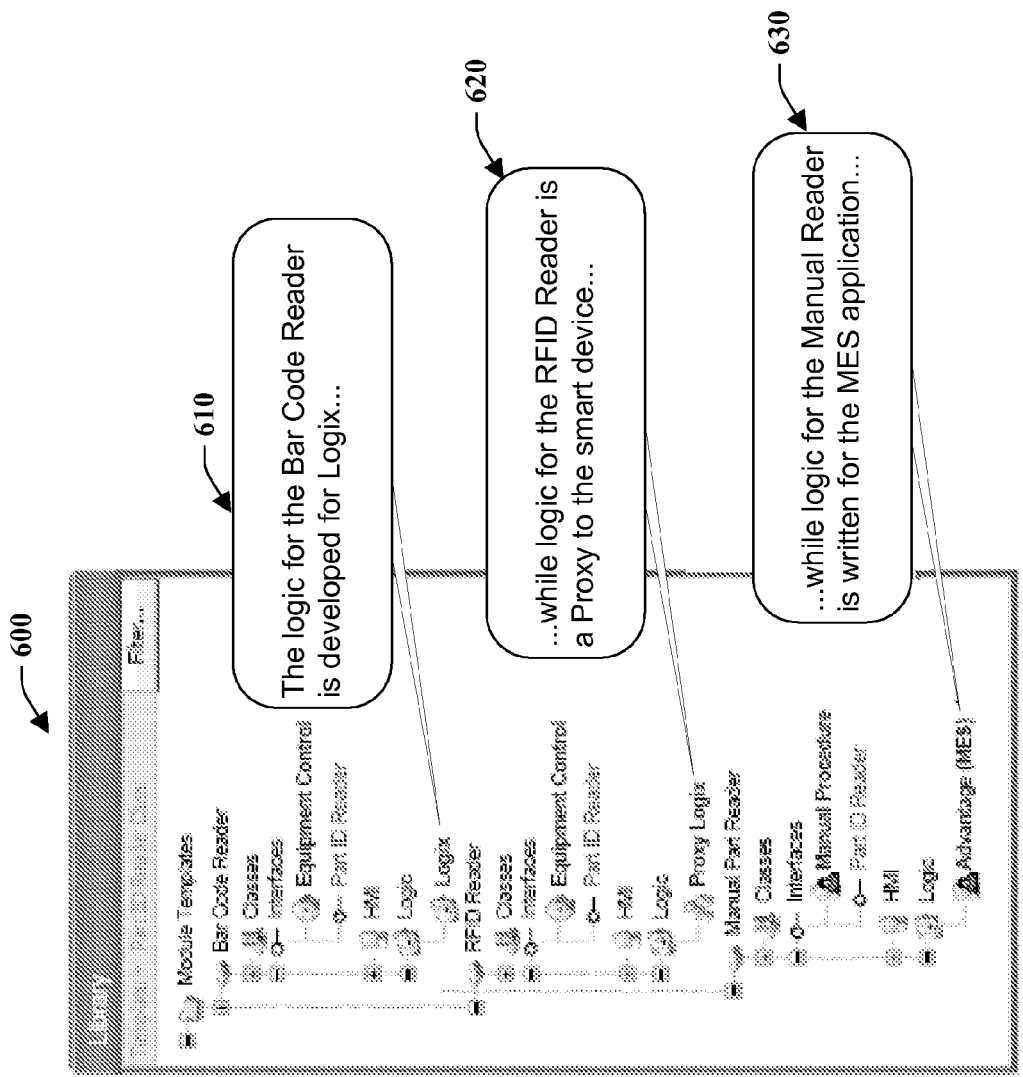

Generally, all of the applications and users of the Part ID Reader are not concerned about these underlying aspects of the logic, where they employ the common interface definition in the module class and shared HMI faceplates. In many cases, the execution environment of the module (controller vs. data model execution environment) is less important than the function set provided by it (interface definition and semantics). Referring briefly to FIG. 6, these execution concepts are illustrated in an example interface 600, where controller logic is provided at 610, RFID logic is provided at 620, and MES logic is provided at 630.

Figure 7:
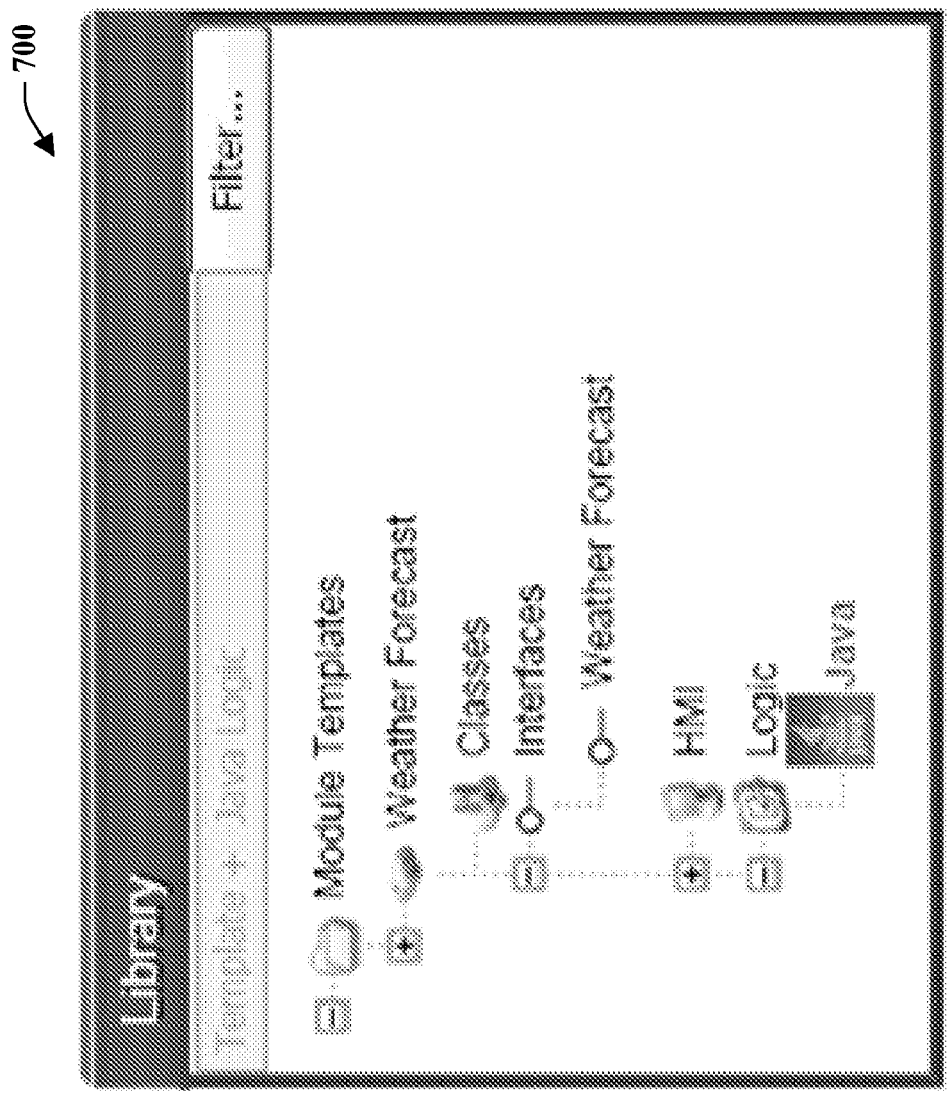

FIG. 7 illustrates an example module interface 700 that employs Java code for execution. As noted previously, the logic for a module can be developed for many different platforms. As another example, consider a weather forecast module 700 that is developed to interact with a web service provided by a weather channel's web site. If the common data model supports a software execution environment that allows users to develop module logic in Java and/or .NET, then the user can develop this module for that target platform. The use of predefined interfaces, classes, templates, and instances is generally the same for the weather forecast module as it is for any other module. Thus, it is the logic development that can vary based on the user's choice of the platform.

Figure 8:
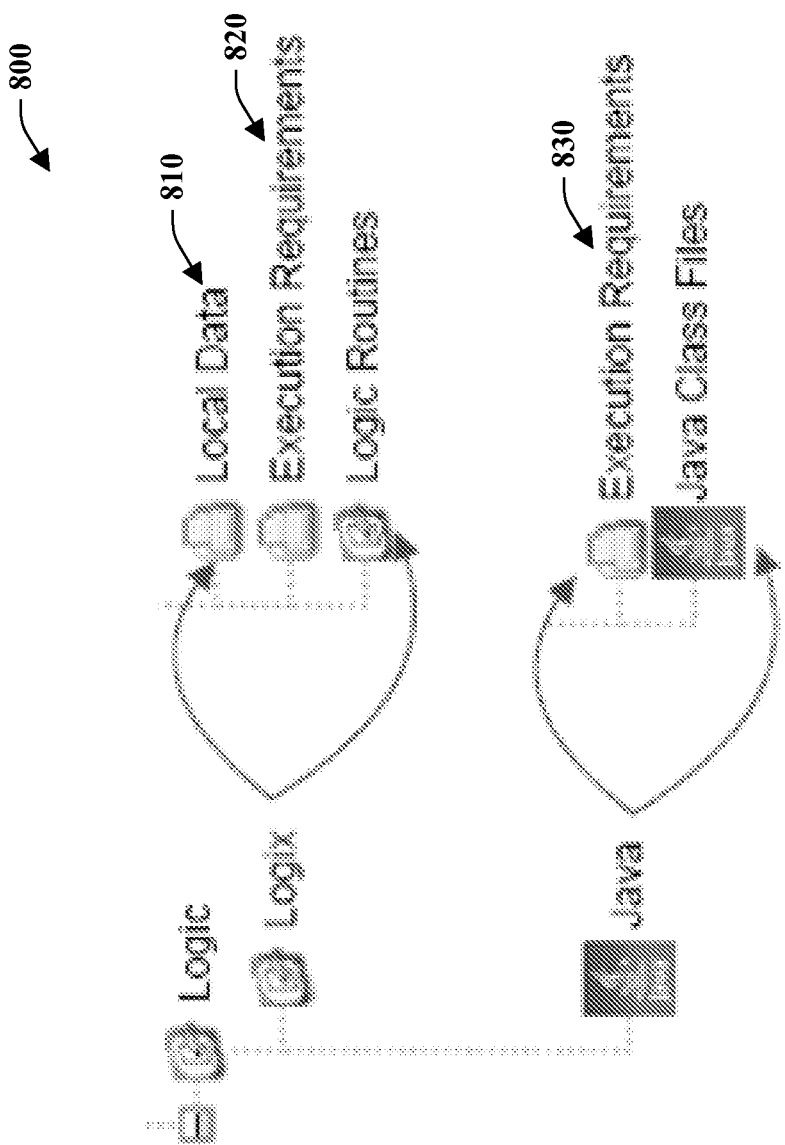

FIG. 8 illustrates aspects related to local data and execution for modules. At 810, local data may be considered for processing with a module. As part of developing a module's logic, users may require local work registers or variables to perform calculations and algorithmic functions. Similar to the logic itself, the definition of this local data 810 is typically specific to the platform of the logic. In one example, private tags may be used for local data while in higher level module languages (e.g., Java) there may be variable declarations. Generally the goal is the same for local data 810—to define some data that is private to the module logic that cannot be accessed by other components.

At 820 and 830, execution requirements are considered. A module's logic may have requirements related to how often or how fast it executes. For example, the logic for a module that controls a motion axis in a high speed packaging machine might need to execute every 10 milliseconds. On the other hand, it may be sufficient for a temperature control loop in a process application to run every ½ second. The logic for a higher level alarm management module may need to execute based on an alarm or event in the system. The configuration of the execution requirements for the module's logic also aids in the binding process when a module is assigned to a computing resource to execute. If the computing resource contains a definition of the execution environments it supports (e.g., definition of Task with a configured rate), the system can suggest (or automatically assign) an appropriate binding for the module's logic.

Figure 9:
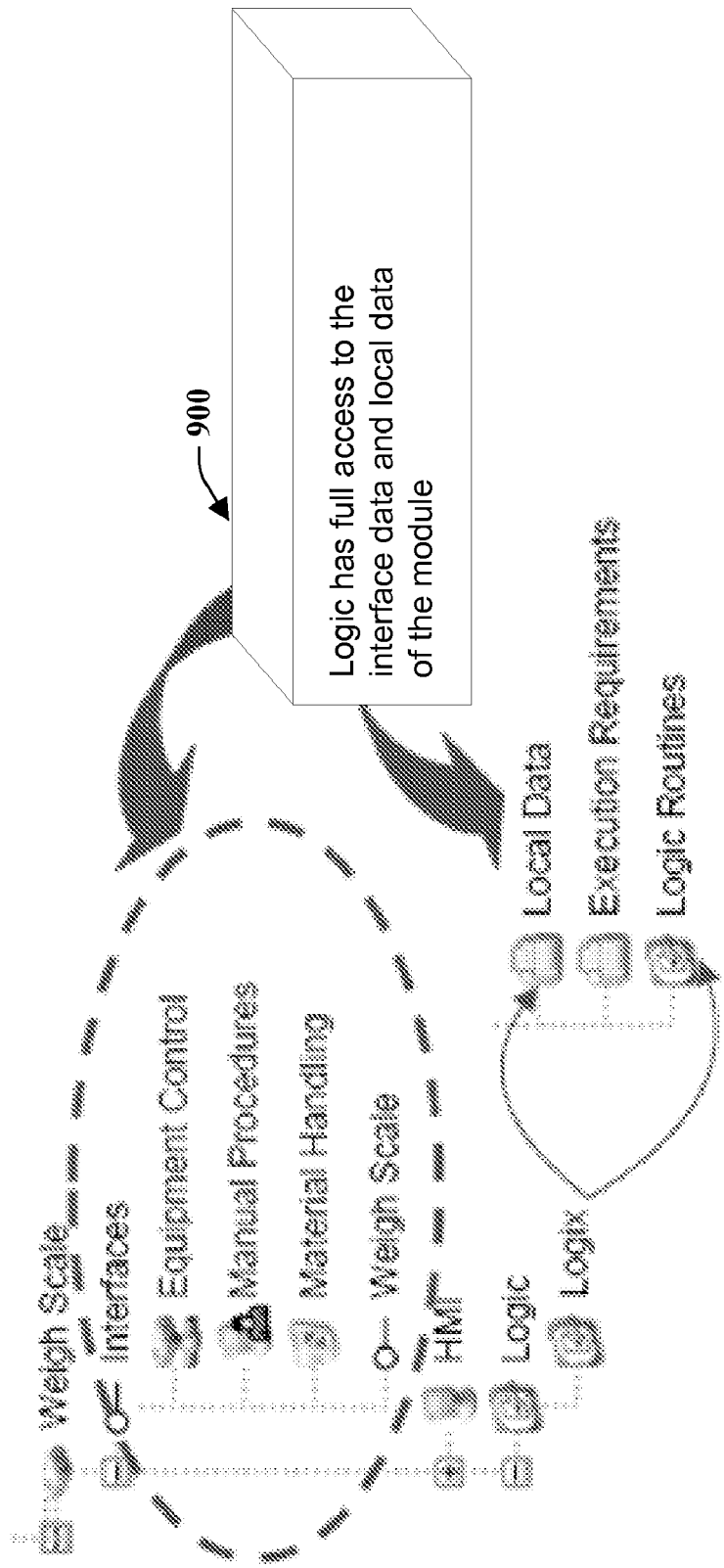

FIG. 9 illustrates module access to interface data and local data. Generally, logic for the module has full access to all of the interface data defined by it and the local data for the logic itself as illustrated at 900. That is, logic should be written to respond to commands, update status, trigger alarms and events, and the like, while also employing local registers to perform calculations and algorithms, if necessary.

Figure 10:
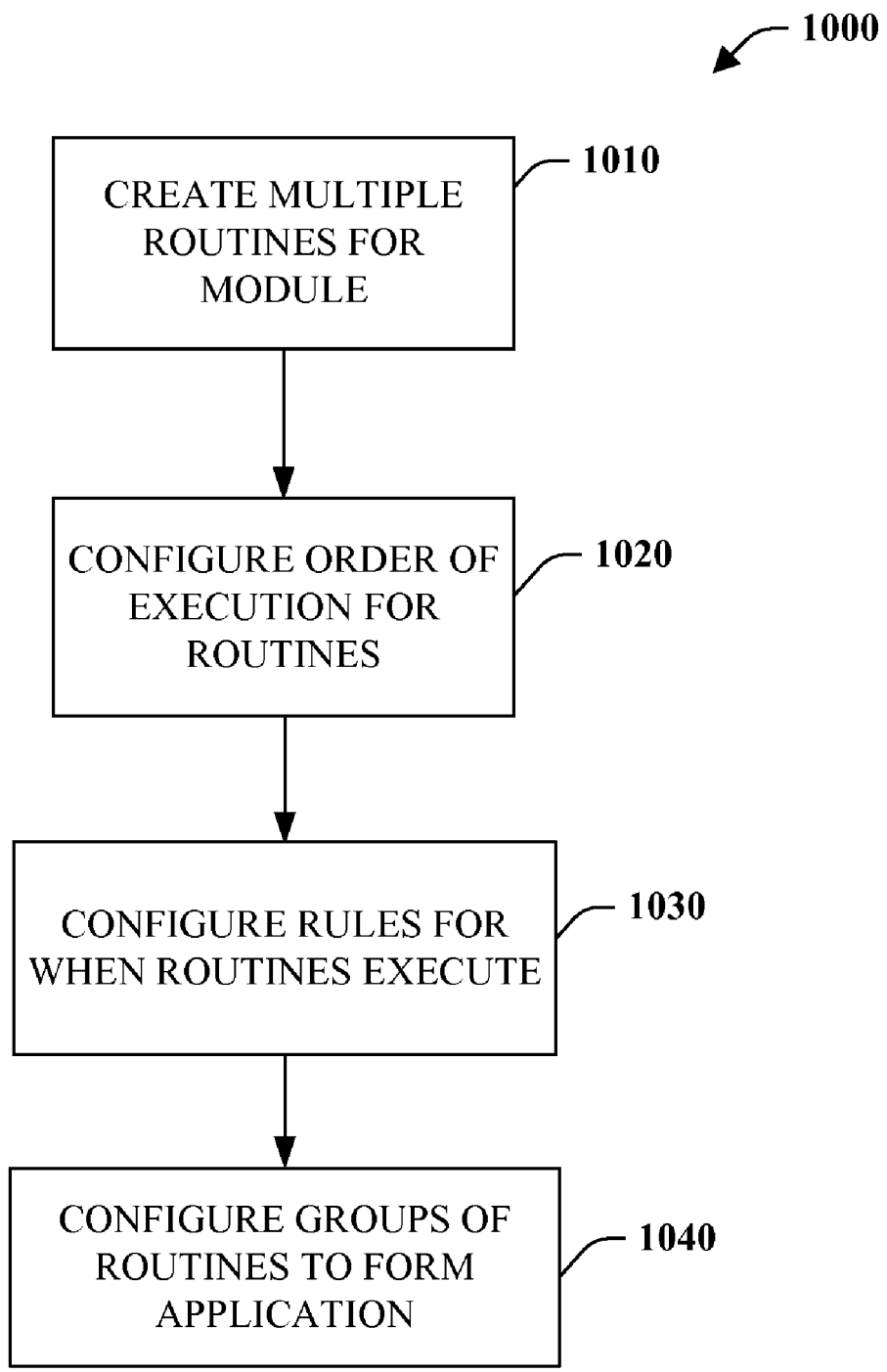
FIG. 10 is a flow diagram illustrating a process for module and controller interactions.

FIG. 10 illustrates a process 1000 for controller and module interactions. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Before proceeding with the process 1000, some discussion is provided regarding logic creation and execution for modules and controllers. The challenges related to developing a module's control logic are similar to those for modular automation in general. Just as users want to modularize the control in their plant into smaller, more manageable, more reusable modules, they may also want to partition the logic of the module into smaller, less unwieldy routines that are focused on specific aspects of the control algorithms. As the complexity of the module's control algorithms increase, the more need there is to separate the logical functions into individual routines to improve debugging and maintenance.

Since the user's model of how they want to partition their control logic varies across vertical industries and customers, various mechanisms provide a flexible framework for developing these routines and configuring how they execute. For example, users of modules that perform equipment control in the process industry may want to partition their logic based on whether an operator or an automated program is commanding the module and whether the module is out of service or in simulation. As another alternative, someone in the high-speed packaging industry may separate their logic based on whether the machine is in automatic, manual, dry run, or maintenance modes. Because of the breadth of applications for controllers, a flexible, configurable framework is provided.

The following provides a Two State Valve example and examines how a control engineer may partition the logic for this module that supports the predefined equipment control interface. In general, the logical steps of the logic are determined, the order of the steps, and when they execute. For example:

| Steps | When to Execute |
| --- | --- |
| 1. Read I/O module inputs | Always |
| 2. Check configuration data | Always |
| 3. Check interlock conditions | Always |
| 4. Execute control algorithms | Always scan one and only one of: |
| a. Out Of Service routine | If Out of Service |
| b. Simulation routine | If In Service and Simulating |
| c. Operator routine | If In Service and Operator owner |
| d. Programmatic routine | If In Service and Program owner |
| 5. Trigger Alarms or Events (if needed) | Always |
| 6. Write I/O module outputs | Always |

To aid the user in partitioning control code in this manner, a framework for developing module logic is provided and is illustrated by the depicted at 1000 of FIG. 10. At 1010, create multiple routines for the module. The routines provide functionality and are generally designed in groups of routines although single routines can be developed. From the example above, this includes reading I/O module inputs, checking configuration data, executing control algorithms, triggering alarms or events, or writing to I/O modules for example. At 1020, configure the order of execution of the routines defined at 1010. As illustrated above, six routines are ordered for execution in the two state valve example. At 1030, one or more rules can be configured (e.g., conditional expressions) for when a routine executes. At 1040, groups of routines are configured where typically one routine per group is configured to execute per scan.

The framework noted above for development of the module logic provides additional extensions so that user can create other routines and configure when they execute. For example, the user could extend an Equipment Phase to include a Post-state routine (to collect statistics) that scans after the state routine. For example as follows:

| Steps | When to Execute |
| --- | --- |
| 1. Prestate routine | Always |
| 2. Execute state routine | Scan zero or one of: |
| a. Aborting | If State = Aborting |
| b. Holding | If State = Holding |
| c. Restarting | If State = Restarting |
| d. Resetting | If State = Resetting |
| e. Running | If State = Running |
| f. Stopping | If State = Stopping |
| 3. Poststate routine | Always |

Figure 11:
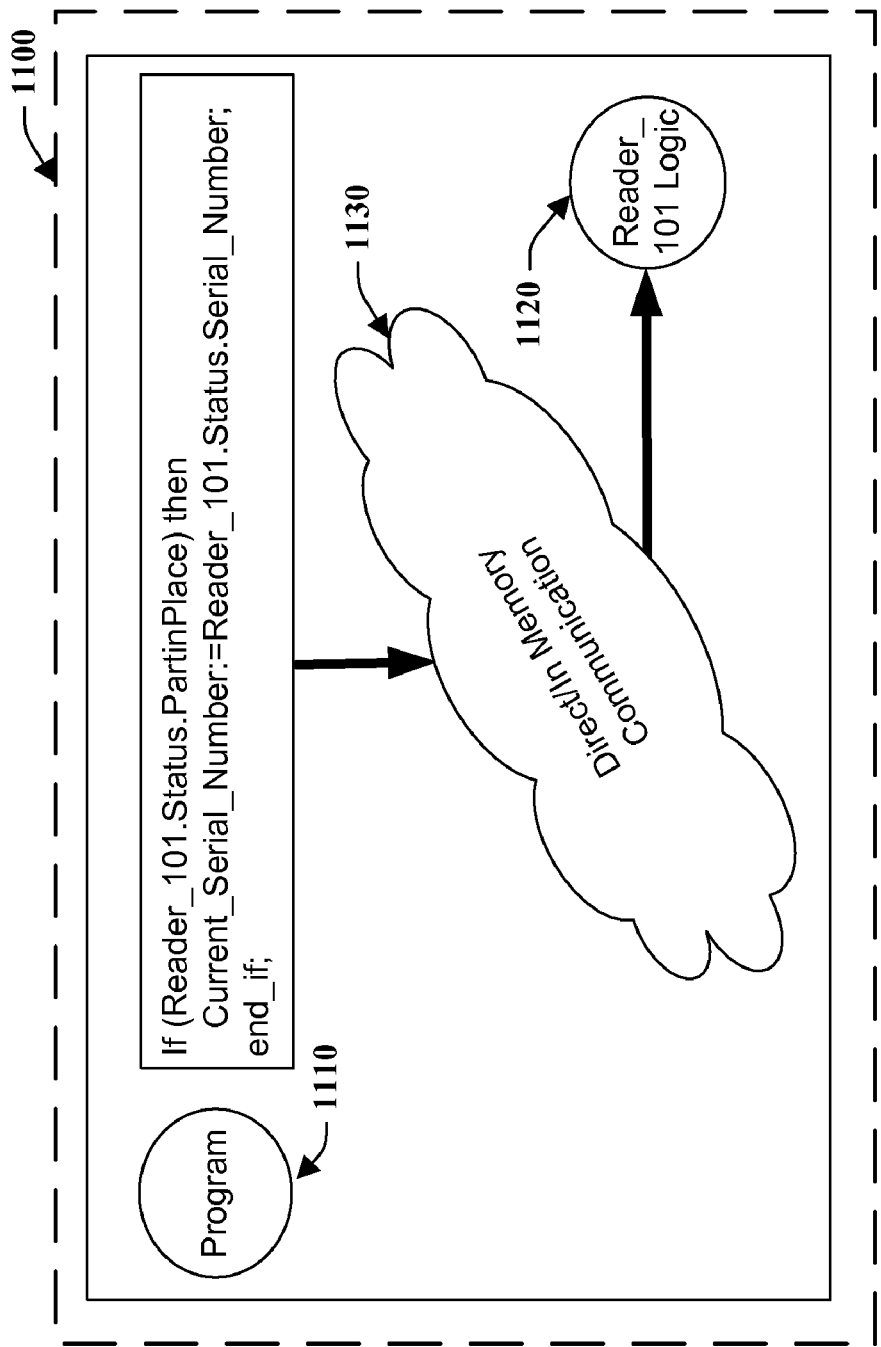
FIGS. 11 and 12 illustrate example local and remote module interactions.

FIG. 11 illustrates an example of local module interaction at 1100. In this example, a program 1110 interacts with reader logic at 1120 through memory communications 1130. When the interface of a module is defined, other applications or control programs can be developed to make use of it. Since these applications are not concerned with the specific logic or the platform on which the module may execute, they can focus on interactions with the module through its public interfaces.

Similar to the development of the module logic, the application logic can depend on the semantics and languages supported in that application. In one example, the interaction with a module's interfaces can be coded in the RLL, FBD, STX, or SFC languages, for example. Interactions can be coded via graphic configurations, connections to the data (tags), and script to send messages or invoke methods on the interfaces of the module. It is noted that a variety of programming paradigms for the various applications can be supported to facilitate the interactions with modules.

To illustrate the above, an example program 1100 interacts with one of the Part ID Readers described above. The program doesn't really concern itself which of the modules retrieves the serial number of the part; it just needs to have that data. Further, the program knows the name of the Part ID Reader that it wants to use, for example Reader_101. Given this name and the module class definition of the Part ID Reader, the program has the information to locate the module and interact with it. At design time, the program then could have code such as:

```
Part_ID_Reader myReader =
UPM.Find("Area_51\Line_67\Reader_101")
// For a data based interface
if ( myReader.Status.PartInPlace ) then
Current_Serial_Number := myReader.Status.Serial_Number;
end_if;
// For a method based interface
Current_Serial_Number := myReader.GetSerialNumber(isPartInPlace);
if ( isPartInPlace ) then
// ...
```

At design time, the program may not know which template of Part ID Reader will actually service these requests and further where that module will be deployed. So, at deployment or runtime, the system locates Reader_101 (i.e., find where it is deployed) and provides the mechanisms to connect the logic in this program with that module.

If Reader_101 was a Bar Code Reader deployed to the same controller as this example program, then the runtime interactions are simple and similar to interacting with data in a local controller. The code in the program directly interacts with the interface of Bar Code Reader module. When the system located Reader_101 (via a Distributed Directory service), it determined that the module is deployed to the same controller. Then, a messaging service can be used to connect to the local object, and this service determined that an in memory access mechanism could be used. Thus, the system deemed that direct access is appropriate as illustrated at 1130.

Figure 12:
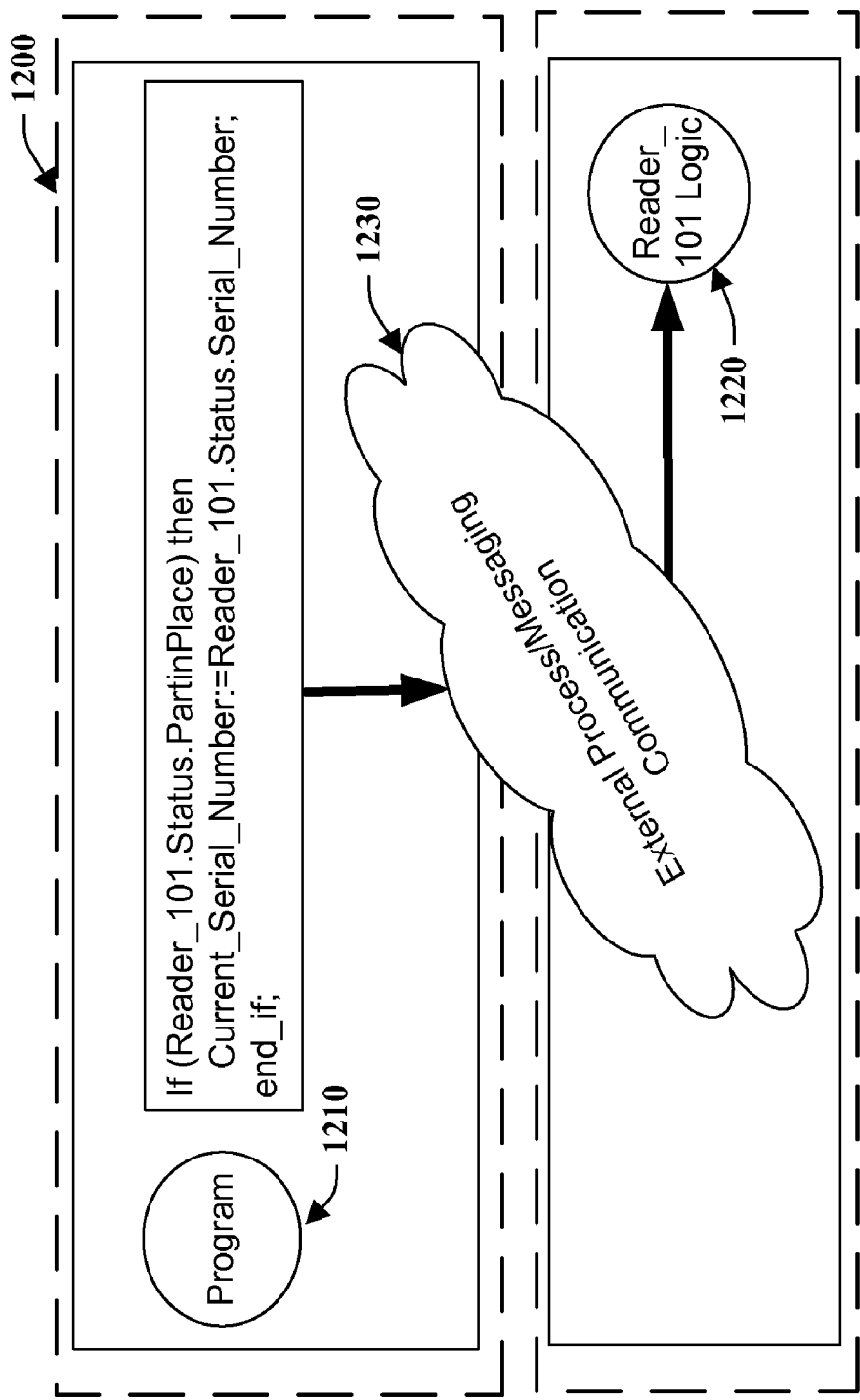
Figure 13:
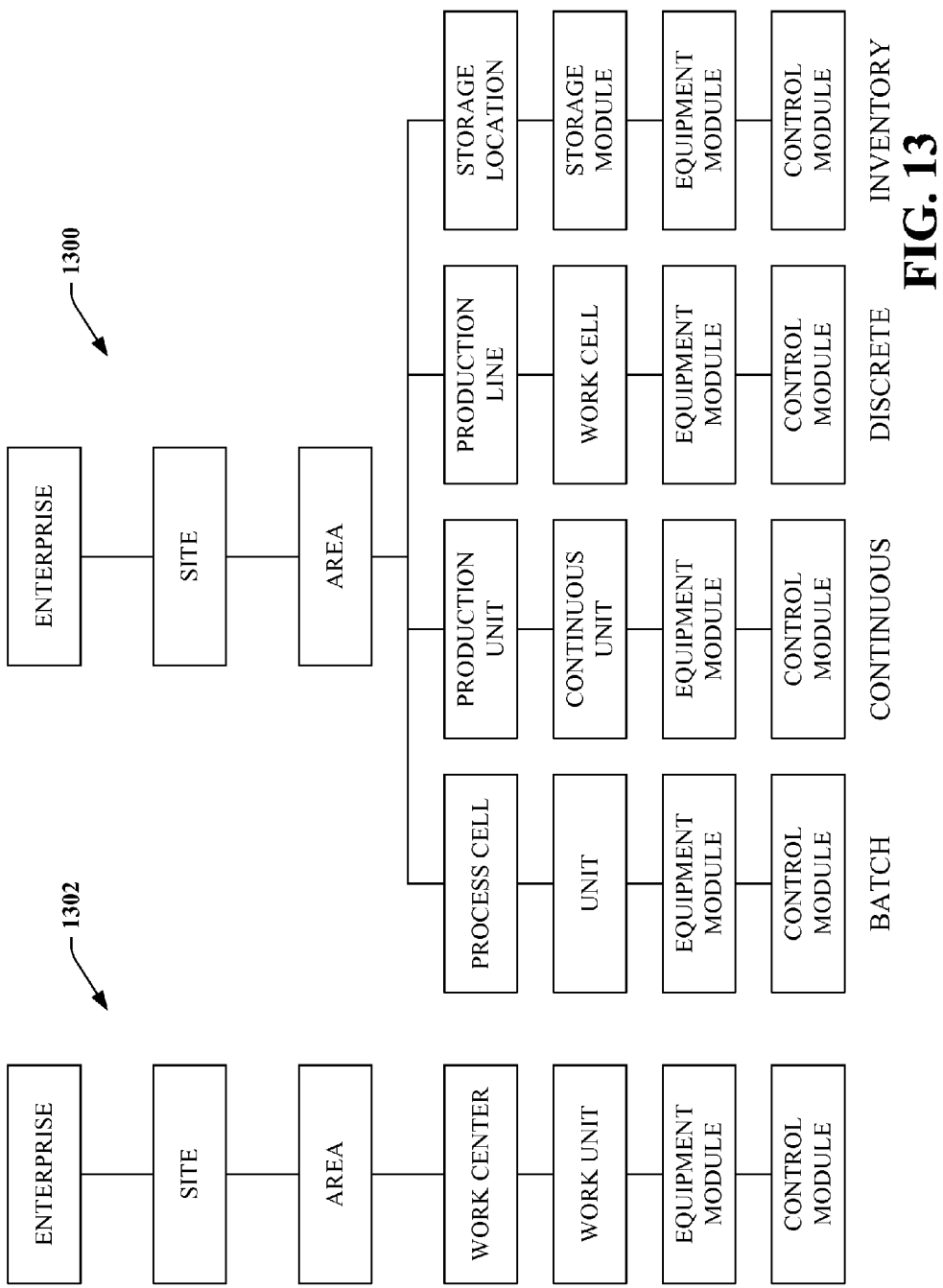
FIGS. 13-16 illustrate a common data model that can be employed with modules in an industrial automation system.

FIG. 12 illustrates an example of remote module interaction at 1200. Similar to the example above depicted in FIG. 11, in this example, a program 1210 interacts with reader logic at 1220 through external process/messaging communications 1230. In this example depicted at 1200, if Reader_101 was a Bar Code Reader, but it was deployed to a different controller, then the system provides a different mechanism for interaction. Since the module is located on a different controller (i.e., the location returned by the Distributed Directory was not the local controller), messaging services in the system determines another mechanism to connect the user program to the module. In this case, it may decide to use producer/consumer tags, message queues, or other mechanisms to accomplish this. Whatever the choice, the messaging services provides reliable interactions and data integrity during the communications between the modules. Similarly, if Reader_101 was a Manual Part ID Reader, deployed on an MES application, the system determines the appropriate means for communication between the program and the module.

In some cases, applications that interact with modules can be limited, because of the environment in which they execute, to certain standards-based mechanisms to define the communication with the module. For example, a module designed for a Java application server might expect to interact with a module via web services or Java Messaging Services. To support such interactions with common data model modules, functions can be provided to interconnect these standard messaging technologies with the interface definitions of modules. Thus, the messaging services provide tools to generate the interfaces for the respective technologies, so that it can provide the communications glue to interconnect them at runtime. For example, a tool to generate WSDL (Web Services Description Language) from a module class definition (and vice versa) may be required to support this functionality.

FIGS. 13-16 illustrate aspects of a common data model noted above. Now turning to FIG. 13, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 1300 illustrates a representation of equipment within a plant given disparate processes. For instance, a hierarchy in accordance with a batch process can include a representation of an enterprise, site, area, process cell, unit, equipment module, and control module.

In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 1302 can be utilized that represents each of the aforementioned hierarchical representations. The hierarchy 1302 can include representations of an enterprise, a site, an area, a work center, a work unit, an equipment module, and a control module. Thus, a common representation can be generated that adequately represents the hierarchy 1300. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 1300).

Metadata can be employed to enable display of such data in accordance with known, conventional usage of such data. Thus, implementation of a schema in accordance with the hierarchy 1302 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 1302 (or similar hierarchy) within a controller.

Figure 14:
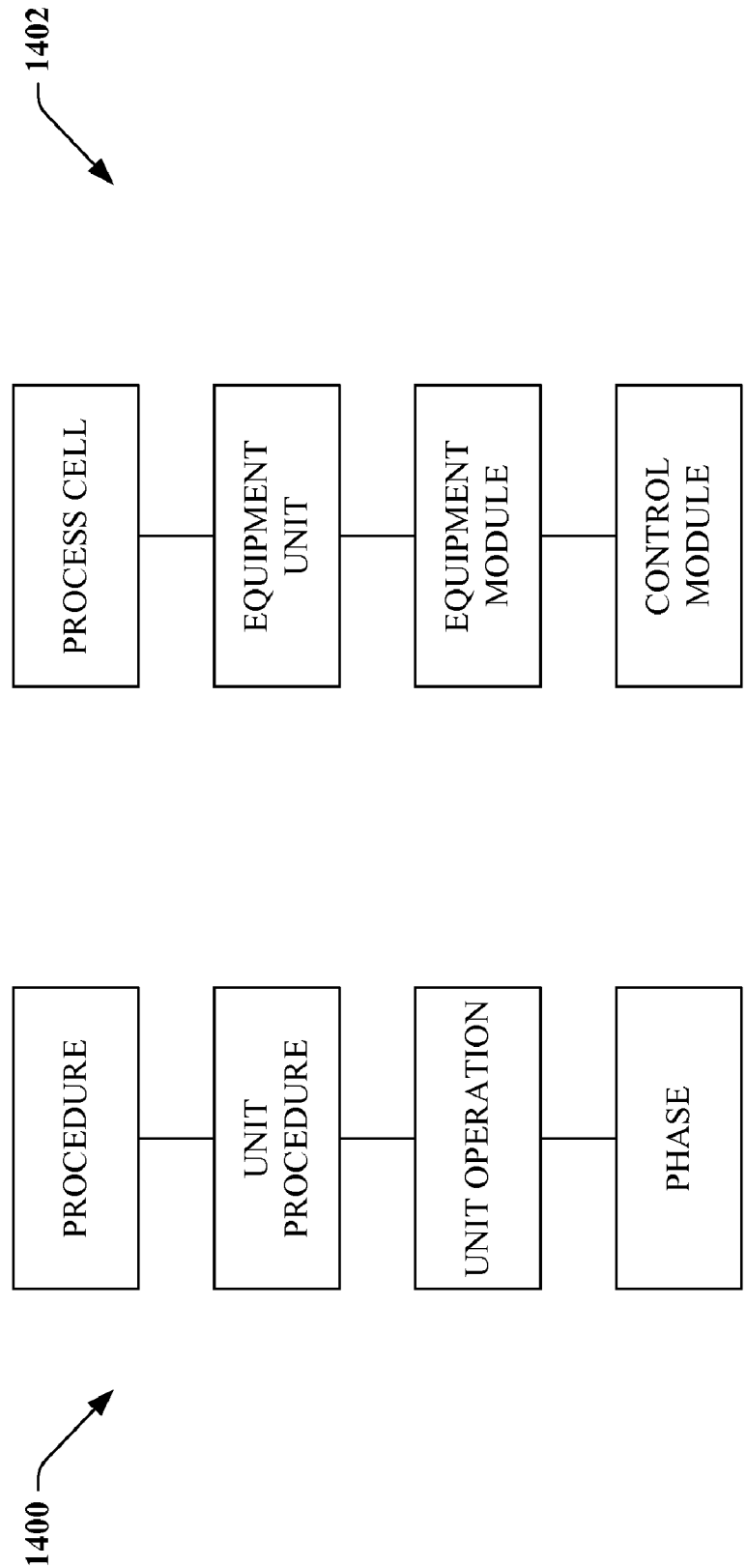

Referring to FIG. 14, standard hierarchies that can be utilized to represent procedures and equipment are illustrated. In particular, a hierarchy 1400 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, pausing a motor, opening and closing a valve, and the like. A hierarchy 1402 relating to a representation of equipment in, for example, a batch process is displayed adjacent to the hierarchy 1400.

Figure 15:
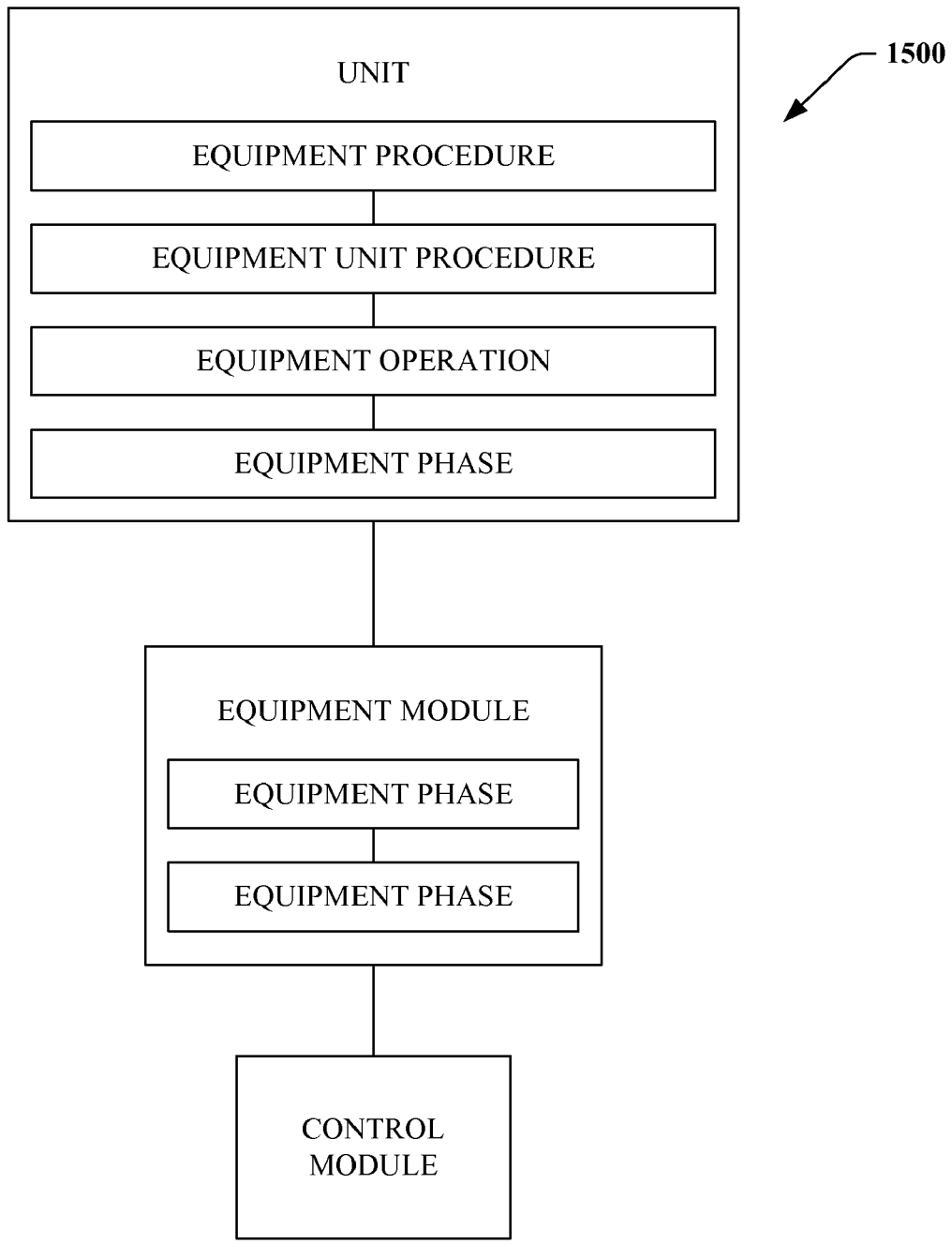
Figure 16:
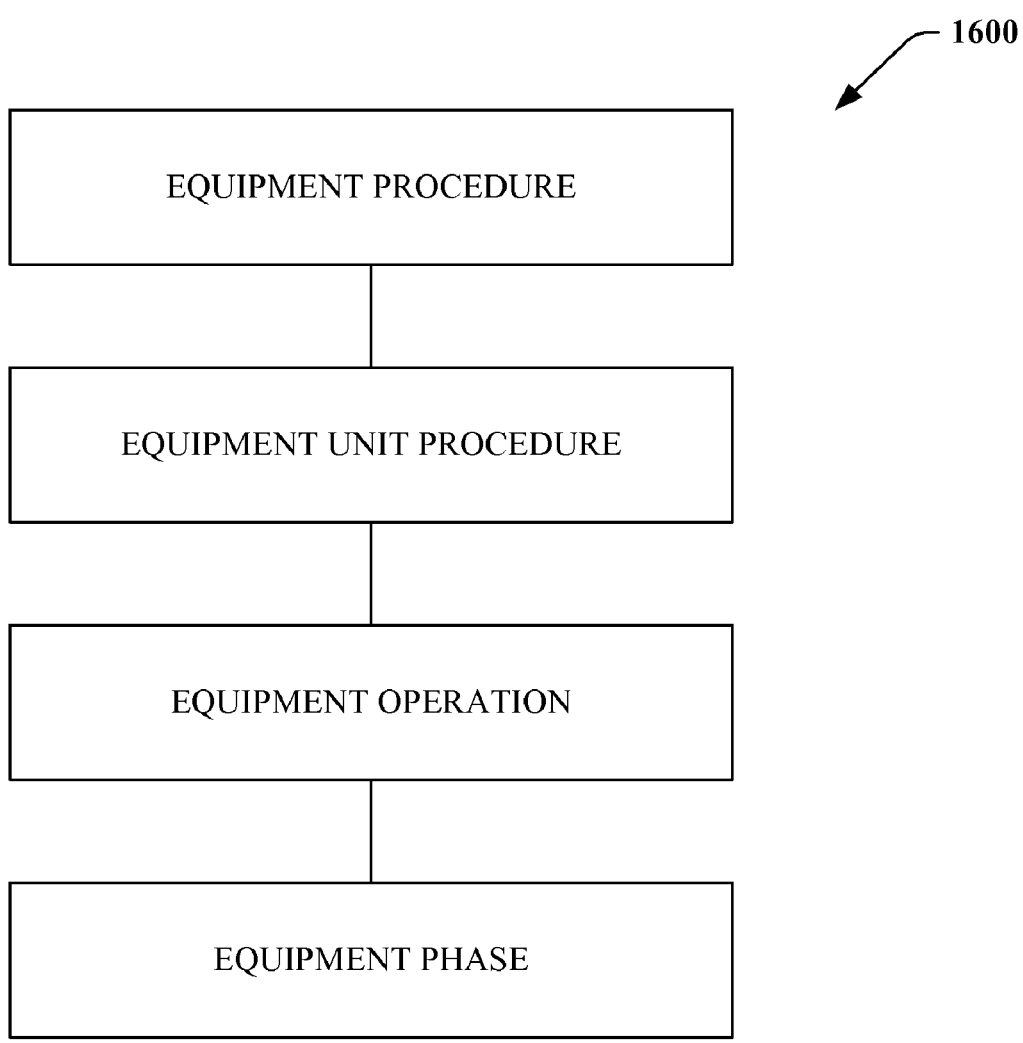

Turning to FIG. 15, a hierarchy 1500 that represents one possible integration of the example hierarchies 1400 and 1402 (FIG. 14). A unit (such as a work unit described in FIG. 13) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 16, a hierarchy 1600 that can be utilized in connection with equipment control is illustrated. The hierarchy is substantially similar to that described within the unit portion of the equipment unit. As stated above, the hierarchies illustrated in FIGS. 13-16 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 13-16 can be existent within a controller, together with state machines that enable creation of such objects.

It is noted that the above modules can be processed on various types of computing devices and resources, where some of these devices may be associated with an industrial control component and other devices associated with standalone or networked computing devices. Thus, computers can be provided to execute the above modules or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit.

The system bus can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory includes volatile memory and non-volatile memory. The basic input/output system (BIOS), containing the basic routines to transfer information between elements within the computer, such as during start-up, is stored in nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Computing devices also includes removable/non-removable, volatile/non-volatile computer storage media.

It is to be appreciated that software components can be provided that act as an intermediary between users and the basic computer resources described in suitable operating environment. Such software includes an operating system which can be stored on disk storage, acts to control and allocate resources of the computer system. System applications take advantage of the management of resources by operating system through program modules and program data stored either in system memory or on disk storage. It is to be appreciated that the present invention can be implemented with various operating systems or combinations of operating systems or shared with control systems.

Computers can operate in a networked environment using logical connections to one or more remote computers, such as remote computer(s). The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection. Network interfaces encompass communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL), and wireless networks.

The systems described above employing the authentication protocols can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a plurality of modules, comprising:
      at least one equipment resource control module, comprising:
         a common interface that includes one or more attributes and input/output capabilities that are standard among the plurality of modules; and
         logic of a first platform that controls a state of at least one equipment resource in the industrial automation system;
      at least one material resource control module, comprising:
         the common interface that includes one or more attributes and input/output capabilities that are standard among the plurality of modules; and
         logic of a second platform that controls at least one component in the industrial automation system that manages at least one material resource; and
      at least one resource module that coordinates the at least one equipment resource control module and the at least one material resource control module, wherein the at least one material resource control module is subordinate to the at least one equipment resource control module; and
      a controller that executes at least one of the plurality of modules to facilitate interactions between one or more components of the industrial automation system and at least one of the equipment resource or the material resource of the at least one of the plurality of modules via the common interface.

2. The system of claim 1, wherein at least one of the plurality of modules is an enterprise module that interacts with a Manufacturing Execution System (MES) layer of an enterprise.

3. The system of claim 1, the controller communicates with at least one other controller and associated module to form a control application.

4. The system of claim 1, wherein at least one of the plurality of modules is a device module that interacts with input/output (I/O) devices.

5. The system of claim 1, the common interface includes public interfaces and attributes based upon a common data model.

6. The system of claim 1, wherein at least one of the plurality of modules is implemented as at least one of a class or template, the class or template are included in a library.

7. The system of claim 1, at least one of the plurality of modules includes one or more attributes accessible via the common interface, the attributes include one or more properties, the properties include at least one of a fault property, a status property, and a module availability property.

8. The system of claim 1, at least one of the plurality of modules publishes one or more verbs via the common interface.

9. The system of claim 1, the at least one of the plurality of modules executes as part of a scan cycle for the controller.

10. The system of claim 1, the at least one of the plurality of modules employs local data mapping for functions resident on the controller and message data mapping for functions remote to the controller.

11. The system of claim 1, at least one of the plurality of modules interfaces to at least one of the controller, a third party device, proxy logic, or an MES application via the common interface.

12. The system of claim 11, the common interface supports remote web language applications.

13. A method to facilitate module and controller interactions, comprising:
   identifying a resource that performs one or more actions in an industrial automation system from a plurality of resources to wrap in a first module, the plurality of resources includes at least one of a machine resource, a personnel resource, an equipment resource, a device resource, or a material resource in an industrial automation environment;
   defining logic to control the one or more actions performed by the resource, wherein the logic controls a state of the resource;
   determining at least one standard interface exposed by the first module independent of a platform of the logic;
   associating the at least one standard interface with at least a second module;
   deploying the first module, comprising binding the first module to at least one runtime process that utilizes a hierarchical common data model; and
   executing the first module on a controller.

14. The method of claim 13, further comprising linking the controller to layers that are common to a layer associated with the controller.

15. The method of claim 13, further comprising partitioning the first module into one or more routines.

16. The method of claim 15, further comprising configuring an order of execution for the routines.

17. The method of claim 15, further comprising configuring one or more rules that specify when the routines execute.

18. The method of claim 15, further comprising configuring one or more groups, the groups specifying one or more routines.

19. The method of claim 15, further comprising reading module inputs, reading configuration data, reading interlock conditions, executing control algorithms, triggering alarms or events, or writing to output modules.

20. The method of claim 19, further comprising executing at least one state sequence.

21. A modular system for an industrial controller, comprising:
- a processor coupled to memory, the processor configured to:
- encapsulate at least one resource that performs one or more actions in an industrial automation system from a plurality of resources of an industrial automation environment in a first module, the at least one resource includes at least one of a machine resource, an equipment resource, or a material resource in the industrial automation environment;
- incorporate logic particular to the at least one resources, the controls the one or more actions performed by the resource;
- expose, by the first module, a standard interface independent a platform of the logic independent a platform of the logic;
- associating the at least one standard interface with at least a second module;
- deploying the first module, comprising binding the first module to at least one runtime process that utilizes a hierarchical common data model; and
- executing the first module on a controller.

22. The system of claim 1, wherein at least one of the plurality of modules hides details of interfacing to the plurality of components of the industrial automation system.

* * * * *